US011933072B2

(12) United States Patent
Hall

(10) Patent No.: US 11,933,072 B2
(45) Date of Patent: *Mar. 19, 2024

(54) SAFETY DEVICE

(71) Applicant: KINGSWAY ENTERPRISES (UK) LIMITED, Swanley (GB)

(72) Inventor: Benjamin Hall, Swanley (GB)

(73) Assignee: Kingsway Enterprises (UK) Limited, Kent (GB)

( * ) Notice: Subject to any disclaimer, the term of this patent is extended or adjusted under 35 U.S.C. 154(b) by 877 days.

This patent is subject to a terminal disclaimer.

(21) Appl. No.: 16/992,517

(22) Filed: Aug. 13, 2020

(65) Prior Publication Data

US 2021/0189767 A1 Jun. 24, 2021

(30) Foreign Application Priority Data

Dec. 19, 2019 (GB) ..................................... 1918884

(51) Int. Cl.

| | |
|---|---|
| ***E05B 45/06*** | (2006.01) |
| ***E05B 47/00*** | (2006.01) |
| ***G08B 21/18*** | (2006.01) |
| *G08B 7/06* | (2006.01) |

(52) U.S. Cl.

CPC .......... *E05B 45/06* (2013.01); *E05B 47/0006* (2013.01); *G08B 21/182* (2013.01); *E05B 2045/0625* (2013.01); *E05Y 2900/132* (2013.01); *G08B 7/06* (2013.01)

(58) Field of Classification Search

CPC ................. E05B 45/06; E05B 47/0006; E05B 2045/0625; E05B 2045/0675; E05B 2047/0086; E05B 17/22; E05B 51/023; E05B 65/102; E06B 7/28; G08B 21/182; G08B 21/043; G08B 21/0461; G08B 21/02; G08B 7/06; E05C 19/166; E05Y 2900/132

See application file for complete search history.

(56) References Cited

U.S. PATENT DOCUMENTS

| | | | | |
|---|---|---|---|---|
| D268,809 | S | 5/1983 | Marontate | |
| 4,763,937 | A * | 8/1988 | Sittnick, Jr. | E05B 65/108 361/170 |
| D309,869 | S | 8/1990 | Dunmore | |
| D322,634 | S | 12/1991 | Callas | |
| D323,788 | S | 2/1992 | Roberts et al. | |

(Continued)

FOREIGN PATENT DOCUMENTS

| | | |
|---|---|---|
| CN | 203961709 U | 11/2014 |
| CN | 205604875 U | 9/2016 |

(Continued)

OTHER PUBLICATIONS

Great Britain Patent Application GB1918884.6 Search Report dated Jan. 13, 2021.

(Continued)

*Primary Examiner* — Eric Blount

(74) *Attorney, Agent, or Firm* — Erise IP, P.A.

(57) ABSTRACT

Disclosed herein is a safety device for attachment at an edge of a door leaf. The safety device comprises a pressure monitor and an electromagnetic lock element. The pressure monitor is configured, in response to a force being applied to the safety device, to issue a signal.

20 Claims, 7 Drawing Sheets

(56) References Cited

U.S. PATENT DOCUMENTS

| | | | |
|---|---|---|---|
| D325,355 S | 4/1992 | Meguerdichian et al. | |
| D425,810 S | 5/2000 | Siller et al. | |
| D449,244 S | 10/2001 | Ginzel | |
| 6,544,200 B1 | 4/2003 | Smith et al. | |
| D496,577 S | 9/2004 | Cohrs, Jr. et al. | |
| 7,024,823 B2 | 4/2006 | Keller | |
| 7,118,141 B2 | 10/2006 | Cohrs, Jr. et al. | |
| 7,132,642 B2 | 11/2006 | Shank et al. | |
| RE42,991 E | 12/2011 | Cook | |
| RE44,039 E | 3/2013 | Cook | |
| 8,646,206 B2 | 2/2014 | Gilchrist | |
| D743,290 S | 11/2015 | Welch et al. | |
| 2002/0183673 A1* | 12/2002 | Naft | A61F 5/0125 602/16 |
| 2010/0325967 A1 | 12/2010 | Pearson et al. | |
| 2011/0068927 A1 | 3/2011 | Berger | |
| 2011/0295215 A1* | 12/2011 | Nielsen | G16H 20/17 604/257 |
| 2017/0226784 A1* | 8/2017 | Davis | E05B 47/00 |
| 2018/0075961 A1* | 3/2018 | Davis | E05B 47/0002 |
| 2018/0106077 A1* | 4/2018 | Shen | E05B 17/10 |
| 2018/0148960 A1* | 5/2018 | Finley | E05C 19/003 |
| 2019/0238357 A1* | 8/2019 | Marcinkowski | G08B 13/08 |

FOREIGN PATENT DOCUMENTS

| | | |
|---|---|---|
| CN | 107890217 A | 4/2018 |
| CN | 207651827 U | 7/2018 |
| CN | 108388296 A | 8/2018 |
| CN | 207813257 U | 9/2018 |
| CN | 208030656 U | 11/2018 |
| CN | 209444091 U | 9/2019 |
| DE | 3007170 A1 | 9/1981 |
| DE | 3706624 A1 | 9/1987 |
| FR | 3066218 A1 | 11/2018 |
| GB | 4030455 | 6/2013 |
| WO | 2019220089 A1 | 11/2019 |

OTHER PUBLICATIONS

"Instastop Door Top Alarm" available Aug. 22, 2019, [online], [site visited Aug. 22, 2019]. Retrieved from Internet, URL: https://anti-ligature-shop.co.uk/product/intastop-door-top-alarm/ (Year: 2019).
"Kingsway KG500 Anti Ligature door top monitor". available Aug. 22, 2019, [online], [site visited Aug. 22, 2019]. Retrieved from Internet, URL:https://anti-ligature-shop.co.uk/product/kingsway-kg500-anti-ligature- -door-top-monitor/ (Year: 2019).
"Piedmont Door Solutions" available Aug. 22, 2019, [online], [site visited Aug. 22, 2019]. Retrieved from Internet, URL: http://www.piedmontdoorsolutions.com/products/anti-ligature-solutions-/ (Year: 2019).
Great Britain Patent Application GB1916899.6 Combined Search and Examination Report dated May 19, 2020.
Baumer, Inductive Proximity Switch, IFFM 08P17A6/L, Dec. 18, 2016.
Keller, "Inpatient Suicide Prevention," Joint Commission Journal on Quality and Patient Safety/ Joint Commission Resources, Jul. 2008.
Yeager, et al., "Measured Response to Identified Suicide Risk and Violence: What You Need to Know About Psychiatric Patient Safety," Oxford University Press, 2005.
Canadian Patent Application 3089499 Office Action dated Jan. 27, 2022.
Great Britain Patent Application 191884.6 Combined Search and Examination Report dated Jun. 3, 2020.
Great Britain Patent Application 2110845.1 Combined Search and Examination Report dated Aug. 24, 2021.

* cited by examiner

SAFETY DEVICE

RELATED APPLICATIONS

This application claims priority to Great Britain Patent Application No. 1918884.6, filed Dec. 19, 2019, the disclosure of which is incorporated herein by reference in its entirety.

FIELD

The present disclosure relates to a safety device for attachment to a door leaf, and in particular to a safety device that is configured to improve the safety of doors and door leaves.

BACKGROUND

In psychiatric hospitals and prisons, a problem exists that patients and inmates may wish to cause themselves harm using a ligature created by securing a rope, cable or length of fabric around an available anchor point in a room.

An example of this is door fittings. Individuals may try to create a ligature by securing a rope, a cable, or a length of fabric, around any edge of a door leaf. U.S. patent application Ser. No. 12/915,218 describes a door alarm system which activates when a door is closed with something over the top edge of the door leaf. Such a door alarm system can detect a sheet, cord or the like over the top edge of a door leaf. But the bottom and closing edges of door leaves are also a concern.

Another example is door lock mechanisms, which are conventionally found on the closing edge of door leaves, may try to create a ligature by looping a rope, a cable, or a length of fabric, around a thrown lockbolt or barrel latch of a lock mechanism. The door alarm system disclosed in U.S. patent application Ser. No. 12/915,218 does not address this problem. Clearly, dispensing with door lock mechanisms is not an option in psychiatric hospitals and prisons, because security is also an important consideration.

There exists a need for door systems which address the safety risks discussed above. Moreover, there exists a need for a device which eliminates the safety risks discussed above, and which is retrofittable to existing door systems—to thereby minimise the cost of improving the safety of door systems.

SUMMARY

In a first aspect there is provided a safety device for attachment at an edge of a door leaf, the safety device comprising a pressure monitor and an electromagnetic lock element; the pressure monitor configured, in response to a force being applied to the safety device, to issue a signal.

Because an electromagnetic lock element is used in lieu of a mechanical lock mechanism, the safety concerns associated with mechanical lock mechanisms (as discussed in the background section above) are eliminated. Furthermore, because the safety device incorporates both an electromagnetic lock mechanism and a pressure monitor, it can be attached along a closing edge of a door leaf without having to dispense with a locking mechanism at the closing edge. As the reader will understand, by employing the safety device described herein, it is possible to add pressure sensitivity to any edge of a door leaf—without having to dispense with a locking mechanism.

Electromagnetic door locks include two parts: a ferromagnetic lock plate, and an electromagnet. One of these (typically the ferromagnetic lock plate) attaches to a door leaf, and the other (typically the electromagnet) attaches to a door frame. Accordingly, such electromagnetic door locks are operable to lock and unlock doors. The electromagnetic lock element of the safety device described herein may therefore comprise a ferromagnetic lock plate (so as to be useable with a door frame having an electromagnet). But in other examples it may comprise an electromagnet (so as to be useable with a door frame having a ferromagnet lock plate).

The pressure monitor may be configured, in response to a force being applied to the electromagnetic lock element, to issue the signal. Thus, the safety device may be sensitive to a ligature anchored at the electromagnetic lock element.

The safety device may further comprise a surface plate comprising an opening, wherein the electromagnetic lock element is located within the opening. In particular, the electromagnetic lock element may be configured to project through the opening. The opening may be in a centre of the surface plate, such that the surface plate surrounds the electromagnetic lock element on all sides. The surface plate may have a convex external profile.

The pressure monitor may be configured, in response to a force being applied to the surface plate, to issue the signal. Thus, the safety device may be sensitive to a ligature anchored at regions of the edge of the door leaf that surround the electromagnetic lock element.

In some examples the pressure monitor is configured, in response to a force being applied to the electromagnetic lock element, and in response to a force being applied to the surface plate, to issue the signal. Thus, the safety device may be sensitive to a ligature anchored at any point along a length of the safety device (or, equivalently, at any point along an edge of a door leaf to which the safety device is attached).

The electromagnetic lock element may be configured to float relative to the door leaf. Additionally, or alternatively, the surface plate may be configured to float relative to the door leaf. Herein, where a first component is said to "float" relative to a second component, it is to be understood that the first component is mounted to the second component in such a way that a limited amount of movement between the first and second components is possible. The limited amount of movement may be sufficient to allow pressure to be applied to a pressure sensor of the pressure monitor. In the case of the electromagnetic locking element, the limited amount of movement may be sufficient to allow for magnetic attraction to a door frame.

The pressure monitor may comprise a pressure sensor, such as an electrical pressure sensor. In some examples, the pressure sensor is an electrical pressure switch, such as a ribbon switch. In other examples, the pressure sensor is a resistive pressure sensor, or a piezoelectric pressure sensor. The pressure sensor may extend substantially an entire length of the safety device. At least one of the electromagnetic lock element and the surface plate may be mounted on the pressure sensor.

The pressure monitor may also comprise an alert system connected to the pressure sensor; the alert system configured, upon a force exceeding a predetermined threshold being applied to the pressure sensor, to issue the signal. The predetermined threshold may be at least 50N. In some examples, the predetermined threshold may be at least 60N. In yet further examples, the predetermined threshold may be at least 65N.

Where the pressure sensor is an electrical pressure switch, the alert system may be configured, upon the pressure switch being closed by a force above a predetermined threshold being applied thereto, to issue the alert signal.

Alternatively, where the pressure sensor is a resistive or a piezoelectric pressure sensor, the alert system may be configured, upon a change in an electrical property of the pressure sensor exceeding a predetermined threshold, to issue the signal. The signal may be issued when a change in an electrical property of the pressure sensor exceeds a predetermined threshold. Where the pressure sensor is a resistive pressure sensor, the electrical property is resistance. Where the pressure sensor is a piezoelectric pressure sensor, the electrical property is electromotive force (EMF).

The signal may comprise an electrical signal for transmission to a remote location, for example a central control location. The transmission may be a wired transmission, or a wireless transmission. Thus, the alert system may comprise a wireless transmitter for wirelessly transmitting alert signals (e.g. to a central control system). Alternatively, the alert signal may comprise an audible signal, or a visual signal. Accordingly, the alert system may comprise a buzzer, a speaker, a LED, or a display screen. These are non-exhaustive examples.

The safety device may comprise a base plate configured for attachment along the edge of the door leaf. The pressure sensor may be attached to the base plate. The electromagnetic lock element may be coupled to the base plate and may be configured to float relative to the base plate. The surface plate may further be coupled to the base plate and may be configured to float relative to the base plate. The pressure sensor may be positioned between the base plate and the surface plate. Similarly, the pressure sensor may be positioned between the base plate and the electromagnetic lock element. Thus, the electromagnetic lock element may compress the pressure sensor when an external compressive force is applied thereto. And the surface plate may compress the pressure sensor when an external compressive force is applied thereto.

The electromagnetic lock element may be resiliently biased towards the base plate with a force large enough to retract the electromagnetic lock element into the safety device, and small enough that the signal is not issued when no external force is applied to the electromagnetic lock element. The resilient biasing may be provided by a spring. The electromagnetic lock element may sit substantially flush with the surface plate when retracted into the safety device.

The electromagnetic lock element may comprise a stepped portion configured to contact the electrical pressure sensor. The provision of the stepped portion may enable the electromagnetic lock element to sit substantially flush with the surface plate when retracted into the safety device. The surface plate may include a groove. The pressure sensor may comprise a protrusion that bears against the groove.

The base plate may comprise peripheral upturned edges, the peripheral upturned edges defining a recess within which the surface plate is received. A cavity is defined between the base plate and the surface plate. The pressure monitor is located within and enclosed by the cavity.

In some examples, the pressure monitor may comprise two pressure sensors, for example two electrical pressure sensors. Features of the single pressure sensor as described above may apply equally to each of the two pressure sensors. The two pressure sensors may be arranged parallel to one another, and may be respectively positioned either side of a centreline of the safety device.

The electromagnetic lock element may comprise two stepped portions, wherein each stepped portion is configured to contact a respective one of the electrical pressure sensors. The surface plate may comprise two parallel grooves; and the pressure sensors may each comprise a protrusion for bearing against a respective one of the grooves.

The safety device may be configured for attachment along at least a portion of an edge of a door leaf. In some examples, it may be configured for attachment along substantially an entire edge of a door leaf.

In a second aspect there is provided a safety device for attachment at an edge of a door leaf, the safety device comprising an electromagnetic lock element mounted on the pressure sensor. Accordingly, when a force is applied to the electromagnetic lock element, the pressure sensor will be compressed and thus experience an increase in pressure. The pressure sensor of the second aspect may be part of a pressure monitor of the safety device that is configured, in response to a force being applied to the electromagnetic lock element, to issue a signal.

Each of the electromagnetic lock element, and a surface plate that surrounds the electromagnetic lock element, may be mounted on the pressure sensor. Accordingly, when a force is applied to the electromagnetic lock element and/or to the surface plate, the pressure sensor will be compressed and thus experience an increase in pressure. As will be understood, optional features of the first aspect are equally applicable to the second aspect.

In a third aspect there is provided a door leaf having a safety device according to the first aspect or the second aspect attached along an edge thereof. The safety device may be attached to a closing edge of the door leaf. That is to say, the safety device may be attached to a long edge of the door leaf. The safety device may extend along substantially the entire long edge of the door leaf.

In a fourth aspect there is provided a door comprising a door frame, a door leaf pivotally connected to the door frame, and a safety device according to the first aspect attached at an edge of the door leaf, the door frame comprising an electromagnet positioned to align with the ferromagnetic lock plate when the door is closed. The electromagnetic lock element is a ferromagnetic lock plate. The door leaf may be pivotally connected to the door frame by a hinge at a first edge 1000 of the door leaf, and the safety device may be attached at a second edge 1002 of the door leaf, the second edge 1002 being opposite the first edge 1000.

BRIEF DESCRIPTION OF THE DRAWINGS

Examples of the present disclosure will now be described, by way of example only, with reference to the accompanying figures, in which.

DETAILED DESCRIPTION

Figure 1:
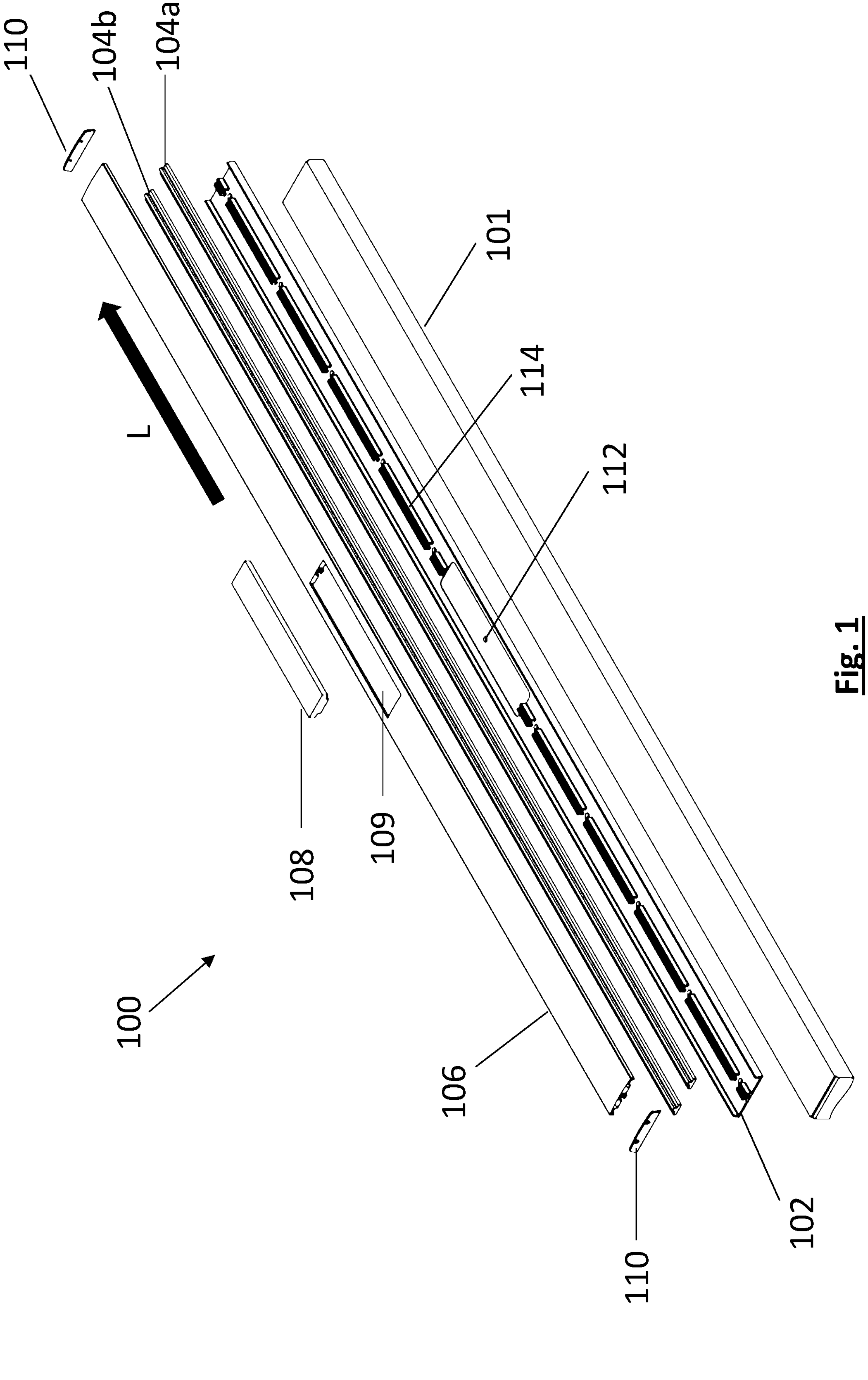
FIG. 1 shows an exploded perspective view of a safety device according to the present disclosure.
Figure 2:
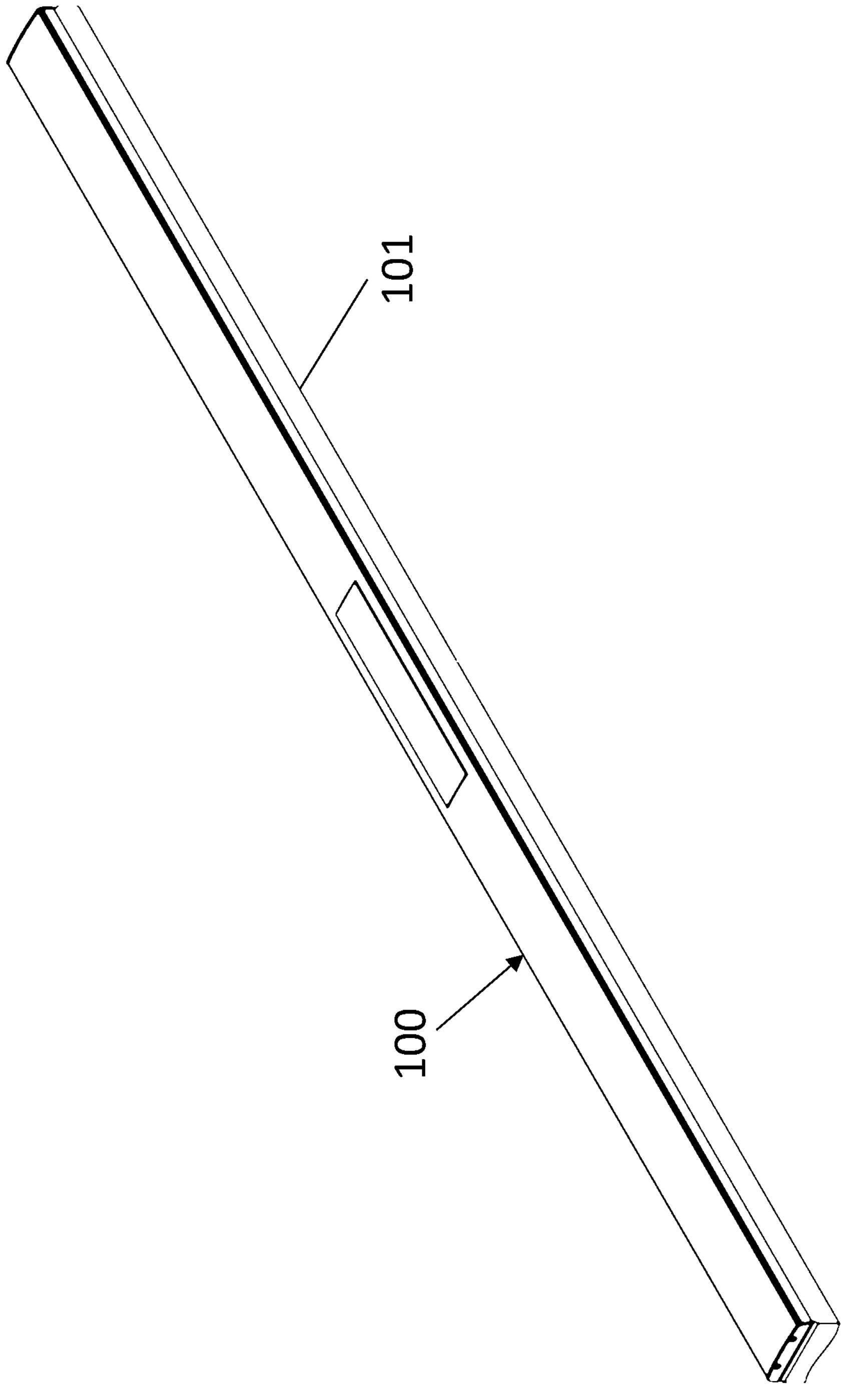
FIG. 2 shows an assembled perspective view of the safety device of FIG. 1.

FIG. 1 shows an exploded view of a safety device 100 for attachment to an edge of a door leaf 101. The safety device 100 has an elongate base plate 102 for attachment to the edge of the door leaf 101; two elongate ribbon switches 104*a*, 104*b*; an elongate surface plate 106; and a ferromagnetic lock plate 108. End pieces 110, surface plate 106, and base plate 102, enclose the ribbon switches 104 and alert system (not shown in FIG. 1), when the safety device is assembled as shown in FIG. 2. With continued reference to FIG. 1, ferromagnetic lock plate 108 is received within an opening 109 in the surface plate 106.

The safety device 100 has a longitudinal axis L that extends along the length of the safety device 100. The length corresponds to the length of the edge of the door leaf 101 to which the safety device 100 is attached in use. Where elongate components are referred to herein, it is to be understood that those components extend in the longitudinal direction L.

A coupling hole 112 is provided in the base plate 102. When assembled, a coupling means (not shown in FIG. 1) extends through the coupling hole 112 to attach the ferromagnetic lock plate 108 to the base plate 102. The coupling means includes a spring for urging the ferromagnetic lock plate 108 towards the base plate 102, such that the ferromagnetic lock plate sits flush with the surface plate 106 in normal operation of the safety device 100. Coupling means allows floating movement of the ferromagnetic lock plate 108 relative to the base plate 102 (and therefore also relative to the door leaf 101).

Elongate coupling channels 114 are provided along the base plate 102, for attaching the surface plate 106 to the base plate 102. The coupling between the base plate and the surface plate is described in more detail in relation to FIG. 6 below. Coupling channel allows floating movement of the surface plate 106 relative to the base plate 102 (and therefore also relative to the door leaf 101).

FIG. 2 shows an assembled view of the safety device 100 of FIG. 1, mounted to door leaf 101. Only the surface plate 106, ferromagnetic lock plate 108, end pieces 110, and base plate 102 are visible. The other components from FIG. 1 are concealed within the safety device 100. In the depicted example, the ferromagnetic lock plate 108 is located at a centre of the surface plate 106. However, the reader will understand that the ferromagnetic lock plate may be off-centre in other examples.

Figure 3:
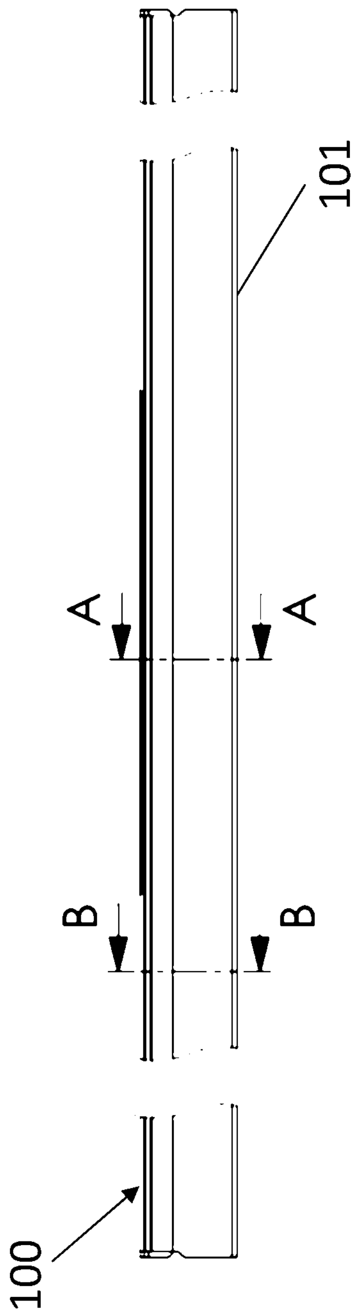
FIG. 3 shows an assembled side view of the safety device of FIG. 1.

FIG. 3 shows a side view of the safety device 100 of FIG. 1, mounted to door leaf 100.

Screws (not shown) extend through the base plate 102 of the safety device 100 and into the edge of the door leaf 101, thus securing the safety device 100 to the door leaf 101. However, other attachment methods are envisaged.

The base plate 102 and surface plate 106 are formed by aluminium extrusion. The ferromagnetic lock plate 108 is steel. As the reader will understand, other materials could be used—provided that the lock plate is ferromagnetic.

Figure 4:
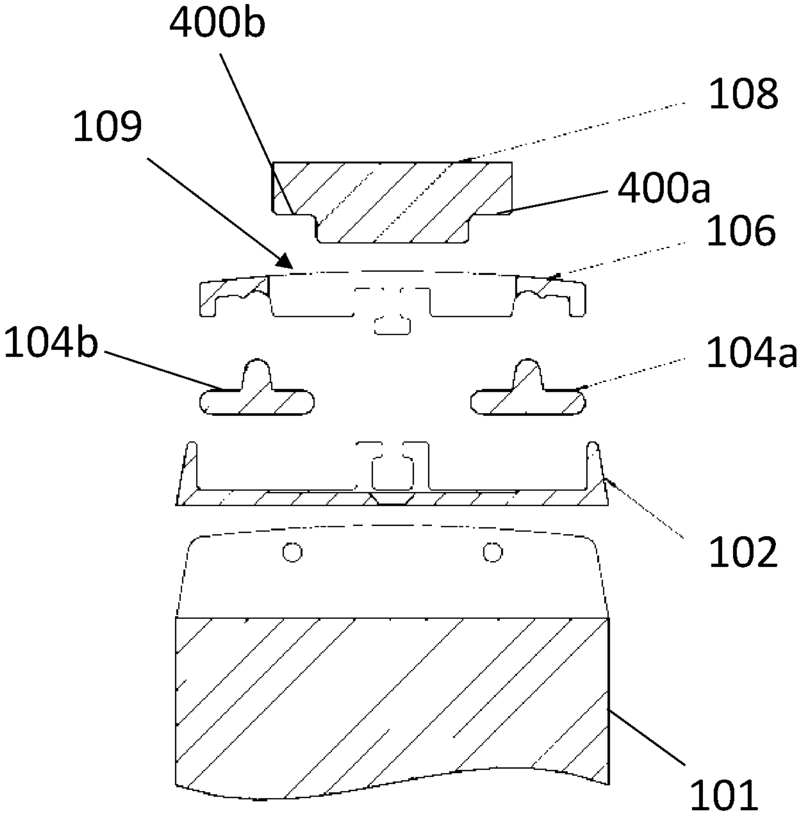
FIG. 4 shows an exploded view of the safety device of FIG. 1, as viewed along cross-section A from FIG. 3.
Figure 5:
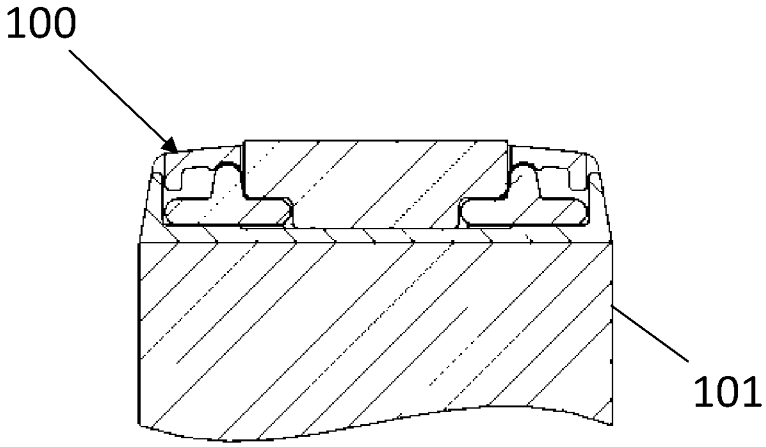
FIG. 5 shows an assembled view of FIG. 4.

FIG. 4 shows an exploded view of the safety device 100, as viewed along cross-section A in FIG. 3. FIG. 5 shows an assembled view of FIG. 4.

As shown in FIGS. 4 and 5, ferromagnetic lock plate 108 is located within opening 109 of surface plate 106, and sits substantially flush with surface plate 106. Furthermore, it includes a first stepped portion 400*a* on the underside thereof that bears against first ribbon switch 104*a*, and a second stepped portion 400*b* on an underside thereof that bears against second ribbon switch 104*b*. In the depicted example, the ribbon switches are T-shaped, and each step engages a shoulder of a corresponding ribbon switch. Thus, these stepped portions enable the ferromagnetic lock plate 108 to sit flush with the surface plate 106, while still bearing against the ribbon switches 104. Because the ribbon switches 104 are located under the ferromagnetic lock plate 108 (that is, between the ferromagnetic lock plate and the base plate), when an external compressive force of a sufficient magnitude is applied to the ferromagnetic lock plate 108 (for example because of a ligature anchored around the edge of the door leaf 101), at least one of the ribbon switches will be closed and an alert will be issued. This is discussed in more detail in FIG. 8.

Figure 6:
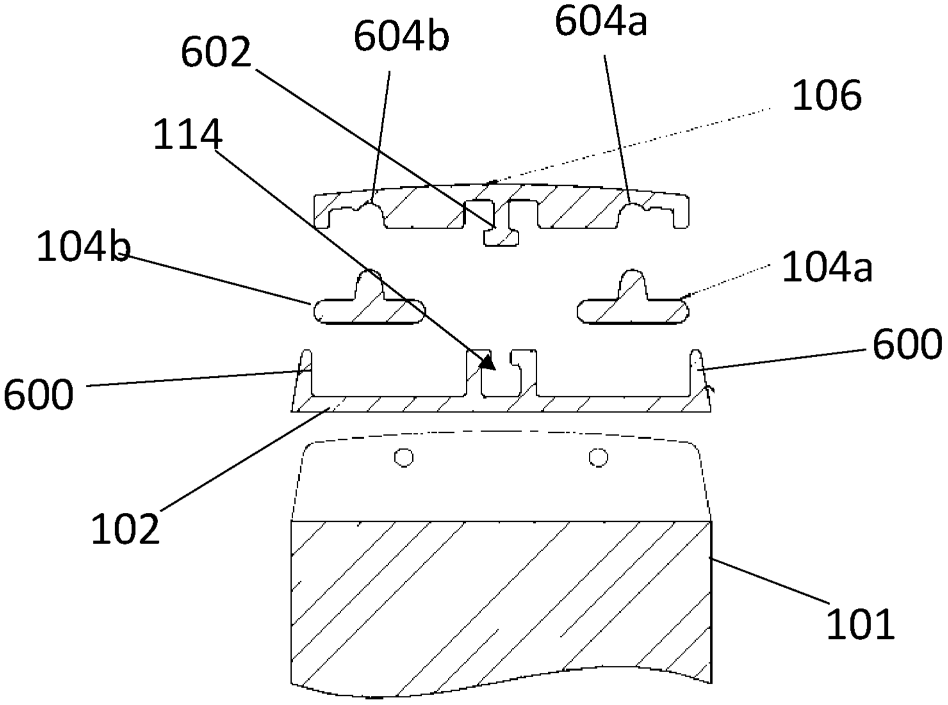
FIG. 6 shows an exploded view of the safety device of FIG. 1, as viewed along cross-section B from FIG. 3.
Figure 7:
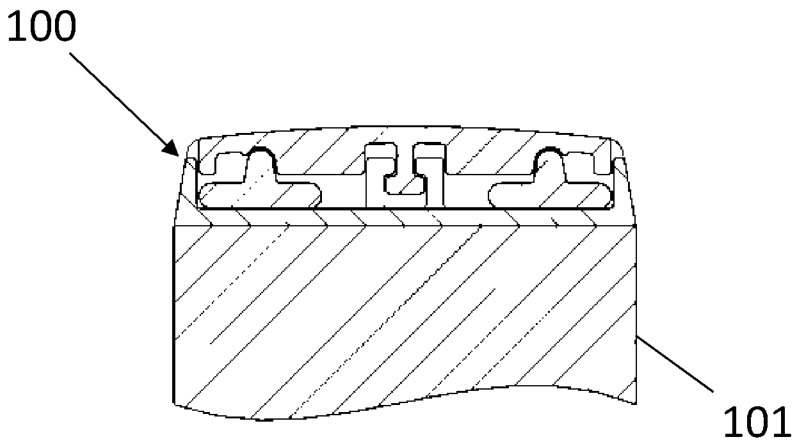
FIG. 7 shows an assembled view of FIG. 6.

FIG. 6 shows an exploded view of the safety device 100, as viewed along cross-section B in FIG. 3. FIG. 7 shows an assembled view of FIG. 6.

As shown in FIGS. 6 and 7, surface plate 106 is received within a recess of the base plate 102 that is defined between peripheral upturned edges 600. Upturned edges eliminate any potential ligature points between the surface plate and the base plate 102; and further restrict the moment of the surface plate in a direction parallel to the plane of the door leaf 101. Furthermore, a bulbus elongate protrusion 602 on the underside of the surface plate 106 engages with the coupling channel 114 of the base plate 102, thereby coupling the surface plate 106 to the base plate 102 while at the same time allowing floating movement of the surface plate 106 relative to the base plate 102, in the direction parallel to the plane of the door leaf. T-shaped ribbon switches 104*a*, 104*b* each have an elongate protrusion that bears against corresponding grooves 604*a*, 604*b* in the underside of the surface plate 106. Because the ribbon switches 104*a*, 104*b* are located under the surface plate 106 (that is, between the surface plate 106 and the base plate 102), when an external compressive force is applied to the surface plate 106 (for example by a ligature anchored around the edge of the door leaf 101), at least one of the ribbon switches will be closed and an alert will be issued. This is discussed in more detail in FIG. 8.

Alert System

Figure 8:
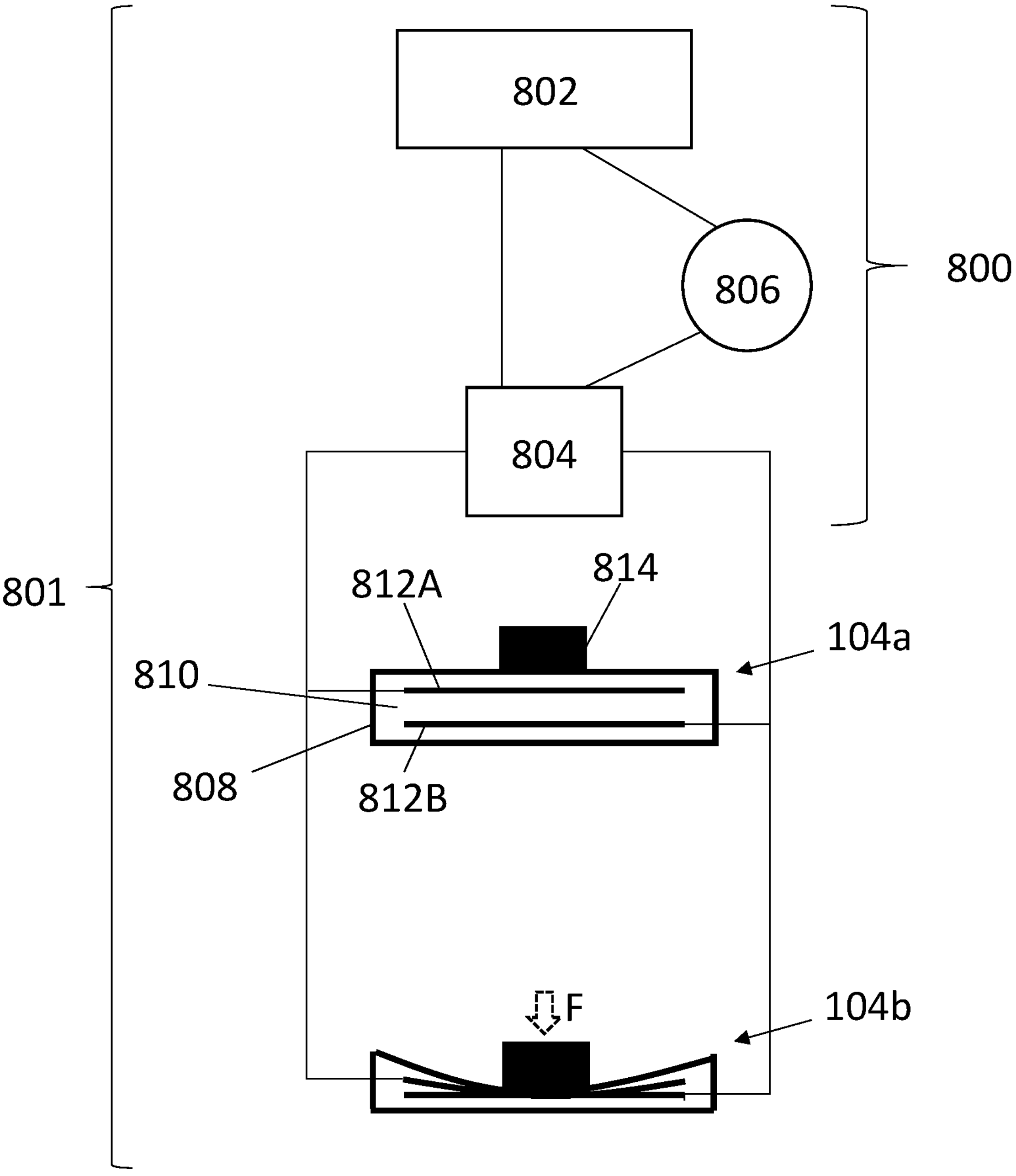
FIG. 8 shows an alert system as used in the safety device of FIG. 1.

FIG. 8 is a schematic illustration of an alert system 800 as used in the safety device of FIGS. 1-7. Collectively, alert system 800 and pressure sensors 104*a*, 104*b* make up pressure monitor 801. As shown, alert system 800 is connected to each of the ribbon switches 104*a*-104*b*. In particular, alert system comprises a power source 802, connecting block 804, and alert interface 806. Pressure monitor 801 is housed within the safety device 100, although the alert interface of the alert system may be located outside of the safety device. The alert system may be configured to issue an audible alert, a visual alert, or may comprise a transmission means (for example a wireless transmission device) configured to transmit an alert signal to a remote location.

As depicted, each ribbon switch comprises a casing 808 having a hollow cavity 810. Disposed at opposing sides of the hollow cavity are a first electrode 812A and a second electrode 812B. The casing 808 is rubber. Electrodes 812A, 812B are conductors.

In a normal (uncompressed) state, as is shown for ribbon switch 104*a*, an air gap exists between the first electrode 812A and the second electrode 812B. In this uncompressed state, the switch is 'open'—i.e. it does not allow current to flow.

However, when a force F is applied to protrusion 814, as is shown for ribbon switch 104*b*, the ribbon switch is compressed by the force F. When the force exceeds a threshold amount, it will cause the first and second electrodes 812A, 812B to make contact—thus closing the switch such that current can flow. When this happens, the circuit between the battery 802 and the alert interface 806 is completed via the connecting block 804. An alert is thereby issued by the alert interface 806 of the alert system 800. A magnitude of the force required to close any one of the ribbon switches can be selected as required. Typically, the force required to close any one of the ribbon switches may be selected as approximately 68N (i.e. a force that is roughly equivalent the gravitational pull on a mass of 7 kg).

Similarly, if more than one of the ribbon switches are closed, an alert will be issued. Only one of the ribbon switches is required to be closed for an alert to be issued.

Mode of Operation

Figure 9:
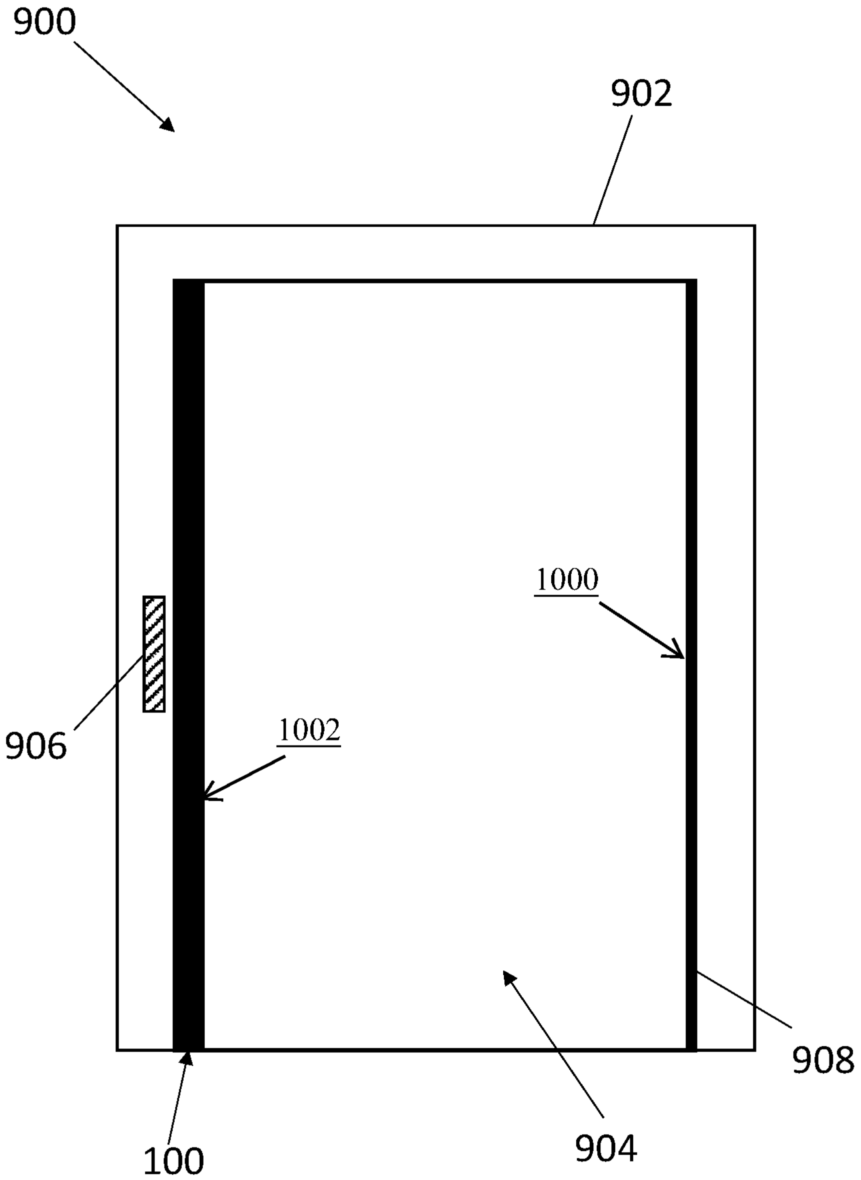
FIG. 9 shows a door system including the safety device of FIG. 1.

FIG. 9 shows a door 900 comprising a door frame 902, a door leaf 904 and a safety device 100 as described above and as shown in FIGS. 1-8. Door frame 902 includes an electromagnet 906 positioned to align with ferromagnetic lock plate 108 (not shown in FIG. 9) of the safety device 100. Door leaf 904 is attached to door frame 902 by hinge 908. Door 900 is shown in the closed position.

When electromagnet 906 is in a locked state, it generates a magnetic field that causes a strong attraction between itself and the ferromagnetic lock plate. Accordingly, opening of the door is not possible in the locked state. When electromagnet 906 is in an unlocked state, it does not generate an electromagnetic field that causes an attraction between itself and the ferromagnetic lock plate. Accordingly, opening of the door is possible in the unlocked state.

The electromagnetic lock (which includes the electromagnet 906 and the ferromagnetic lock plate 108) may be a fail-safe electromagnetic lock, meaning that it unlocks the door when not being supplied with power. Or it may be a fail-secure electromagnetic lock, meaning that it locks the door when not being supplied with power.

The ferromagnetic lock plate 108 may project slightly from the safety device when in the locked state. However, it does not project into a socket in the door frame as would be the case for a thrown lock bolt of a mechanical lock. Therefore, even when locked, the electromagnetic lock does not provide a ligature anchor point when in the locked state.

When the electromagnetic lock is in the unlocked state, the door leaf can be opened by rotating it about the hinge 908. Hinge 908 includes a hollow axle extending the full height of the door. Wires for supplying power to the safety device, and for transmitting wired signals to a remote location, can extend through the hollow axle. This protects the wires from accidental or deliberate damage.

When an individual wishes to cause themselves harm, they may try to loop a ligature around the closing edge of the door. In doing so, a force would be applied to the safety device 100 which, once the force exceeds a predetermined threshold, in turn would compress one or both of the ribbon switches, such that an alert is issued by the alert system of the pressure monitor. This alert may be transmitted to a remote location by the wired connection that passes through the hollow axle of the hinge.

It is to be understood that the above description is intended to be illustrative, and not restrictive. Many other implementations will be apparent to those of skill in the art upon reading and understanding the above description. Although the present disclosure has been described with reference to a specific example implementation, it will be recognized that the disclosure is not limited to the implementations described, but can be practiced with modification and alteration insofar as such modification(s) and alteration (s) remain within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled according to the doctrine of equivalents.

The invention claimed is:

1. A safety device for attachment at an edge of a door leaf, the safety device comprising:
- a pressure monitor; and
- an electromagnetic lock element;
- wherein the pressure monitor is configured, in response to a force being applied to the safety device, to issue a signal.

2. The safety device of claim 1, wherein the pressure monitor is configured, in response to a force being applied to the electromagnetic lock element, to issue the signal.

3. The safety device of claim 1, wherein the electromagnetic lock element is configured to float relative to the door leaf.

4. The safety device of claim 1, further comprising a surface plate comprising an opening, wherein the electromagnetic lock element is located within the opening.

5. The safety device of claim 4, wherein the pressure monitor is configured, in response to a force being applied to the surface plate, to issue the signal.

6. The safety device of claim 5, wherein the pressure monitor is configured, in response to a force being applied to the electromagnetic lock element, and in response to a force being applied to the surface plate, to issue the signal.

7. The safety device of claim 4, wherein the surface plate is configured to float relative to the door leaf.

8. The safety device of claim 1, wherein the pressure monitor comprises a pressure sensor.

9. The safety device of claim 8, further comprising a base plate configured for attachment to the edge of the door leaf.

10. The safety device of claim 9, wherein the pressure sensor is attached to the base plate.

11. The safety device of claim 10, wherein the electromagnetic lock element is coupled to the base plate and is configured to float relative to the base plate.

12. The safety device of claim 11, wherein the electromagnetic lock element bears against the pressure sensor.

13. The safety device of claim 12, wherein the electromagnetic lock element includes a stepped portion, the stepped portion configured to bear against the pressure sensor.

14. The safety device of claim 13, further comprising a surface plate comprising an opening, wherein the electromagnetic lock element is located within the opening, and wherein the surface plate is coupled to the base plate and is configured to float relative to the base plate.

15. The safety device of claim 1,
- wherein the pressure monitor comprises a pressure sensor,
- the safety device further comprising a surface plate comprising an opening, wherein the electromagnetic lock element is located within the opening, and
- wherein the surface plate bears against the pressure sensor.

16. The safety device of claim 1, configured for attachment along at least a portion of the edge of the door leaf.

17. A safety device for attachment at an edge of a door leaf, the safety device comprising:
- a pressure sensor and an electromagnetic lock element, the electromagnetic lock element mounted on the pressure sensor.

18. The safety device of claim 17, further comprising a surface plate that surrounds the electromagnetic lock plate; wherein the surface plate is further mounted on the pressure sensor.

19. The safety device of claim 17, wherein the electromagnetic lock element comprises a ferromagnetic lock plate.

20. A safety assembly associated with a door comprising a door frame, the safety assembly comprising:

a door leaf having a first edge and a second edge opposite the first edge, wherein the door leaf is pivotally connectable to the door frame by a hinge at the first edge, a ferromagnetic lock plate, a safety device attached to the second edge of the door leaf, and an electromagnet positioned to align with the ferromagnetic lock plate when the door is in a closed position.

* * * * *